Oct. 13, 1936.  C. V. KRICHTON  2,056,941
ELECTRICALLY HEATED LIQUID CONTAINER
Filed June 12, 1935
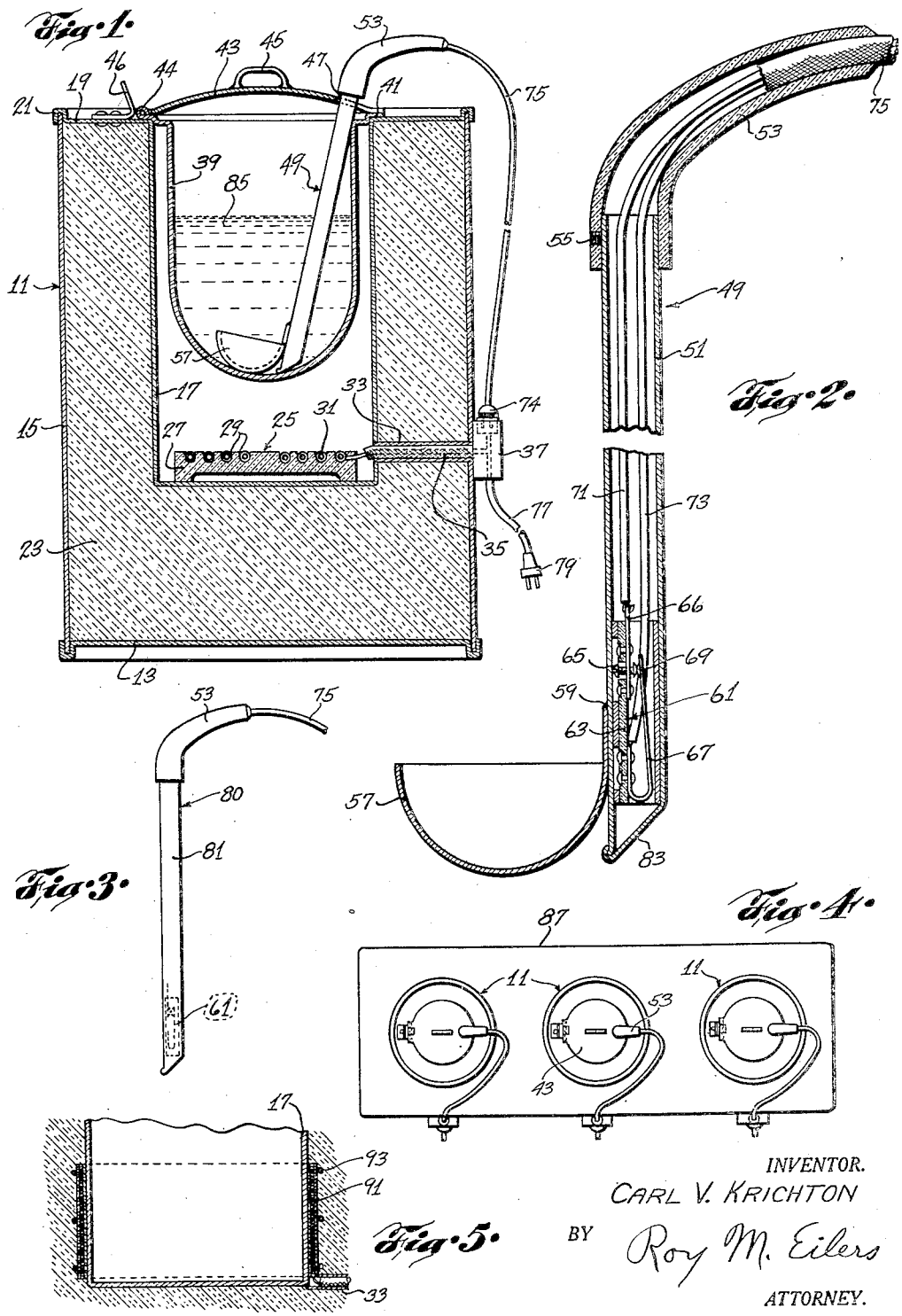
INVENTOR.
CARL V. KRICHTON
BY Roy M. Eilers
ATTORNEY.

Patented Oct. 13, 1936

2,056,941

UNITED STATES PATENT OFFICE 2,056,941

ELECTRICALLY HEATED LIQUID CONTAINER

Carl V. Krichton, Minneapolis, Minn., assignor to McGraw Electric Company, Chicago, Ill., a corporation of Delaware Application June 12, 1935, Serial No. 26,125

10 Claims. (Cl. 219—38)

My invention relates to electrically heated appliances and particularly to an electrically heated fluid food storage appliance.

An object of my invention is to provide a relatively simple and inexpensive hot-food-storing appliance permitting the serving of small portions thereof from time to time.

Another object of my invention is to provide a relatively simple electrically-heated hot-liquid-food-storing appliance having removably associated therewith a stirring or serving means normally immersed in the liquid and embodying a thermal control switch.

Another object of my invention is to provide a relatively simple stirring and/or serving implement having a thermal control switch located therein at its lower end and electrically connected to an electric heater in the appliance to control the same and to preclude complete separation therefrom.

Another object of my invention is to provide a relatively simple, compact and inexpensive assembly for a fluid heater subject to intermittent use.

Other objects will either be pointed out specifically hereinafter during the course of a description of one form of device embodying my invention now preferred by me, or will be apparent from such description without further reference.

In practicing my invention, I provide a heat insulated outer casing having an open-top well therein, an electric heating element associated with the well adjacent the bottom thereof, and an open-top removable fluid-container in the well having its bottom located an appreciable distance above the heating element. An elongated hollow stirring device, which may be in the form of a spoon or ladle having a hollow stem, depends into the fluid container normally immersed in the fluid therein and has a thermal switch located therein at its bottom end and an electrical conductor extends upwardly through the hollow stirrer or the hollow stem of the spoon and through a hollow handle to the heating element to control the same and maintain a fluid in the container at a substantially constant desired temperature.

In the single sheet of drawings,

Figure 1 is a view in vertical section through one form of device embodying my invention, Fig. 2 is a view in longitudinal section through a stirring and serving implement embodying my invention, Fig. 3 is a view in side elevation of a stirring implement which I may use, Fig. 4 is a top plan view of a plurality of such devices assembled on a single support, and Fig. 5 is a fragmentary view, in vertical section, of a modified form of electric heating element which I may use.

I have elected to illustrate and describe an appliance embodying my invention built to hold a quantity of soup, the temperature of which is continuously maintained at a predetermined value, which appliance may be located in a convenient place in a store where any person desiring to test a sample of the soup may do so at his convenience and be assured that the sample is at the proper temperature for use. I do not, however, desire to be limited to this use alone since a device of this kind is useful also in other related fields. Thus it may be used as a liquid glue dispenser where relatively small and possibly measured quantities of hot liquid glue are required from time to time by an operator. Other applications or uses of the same general kind are, of course, obvious.

Referring first more particularly to Fig. 1 of the drawing, I have there illustrated an assembly 11 comprising a bottom plate 13, an outer tubular casing 15, and an inner casing 17. The bottom cover 13 may be secured to the lower edge of tubular member 15 in any desired or suitable manner and the inner casing 17 may have an open top and an upper horizontally-extending flange 19, the outer edge of which is crimped over as shown at 21 to support the casing 17 on the outer tubular casing 15 at its upper edge. It will be noted that the inner casing 17 is much smaller than is the outer tubular casing 15 to provide a space extending not only horizontally radially between the two casings, but also below the bottom of the inner casing 17, which space is filled with a suitable heat-insulating material 23, which may be mineral wool.

An electric heating element 25 is located in the bottom of the inner casing 17 and may be of any suitable or desired type well known in the art, but is here shown as comprising a refractory base 27 having grooves 29 of any desired configuration in its upper surface, a resistor 31, which may be of helical shape, being located in said grooves.

While I have illustrated and described a casing assembly 11 which is of substantially annular shape in horizontal section, I do not desire to be limited thereto but have shown it thus because I have built and tested a number of such circular casing assemblies.

A tubular member 33 may be provided to extend outwardly from the inner casing 17 to the outer casing 15 to receive therein a conductor 35 of any suitable or desired kind embodying two conductor wires extending into a closed or covered terminal block 37 which may be secured by means not shown in the drawing against the outside of tubular member 15.

A fluid container 39 which may also be of substantially circular shape in lateral section, is provided with an upper outwardly extending peripheral flange 41 whereby the container 39 may be supported from the upper edge of inner casing 17. The length of the fluid container 39 is such that its bottom is an appreciable distance above the heating element 25 and I prefer to make the bottom rounded, substantially as shown in Fig. 1 of the drawing for a purpose which will hereinafter appear. A cover 43 is provided having a bail or handle 45 to permit of manually tilting it relatively to the container 39, on a hinge 44, a stop 46 limiting the backward tilting movement. The cover is provided with a recess 47 substantially diametrally opposite to the hinge 44, to receive the stem 51.

A stirring implement, shown more particularly in Fig. 1 of the drawing as a spoon 49, comprises a tubular stem 51, to the upper end of which there is secured a hollow handle 53 which may be of some suitable heat-insulating material and the handle may be secured in place by a headless set screw 55 or in any other desired manner. A bowl or spoon 57 is secured to the hollow stem 51 adjacent its bottom end in any suitable or desired manner as by welding the two together as is indicated at 59 in Fig. 2 of the drawing. When the spoon 49 is raised, it will cause the cover 43 to be tilted backwardly and against the stop 46, so that it is not necessary to raise the cover by the handle 45 when it is desired to withdraw the ladle 49.

A thermal control switch 61 is located within the hollow stem 51 and I prefer to locate the same at substantially the bottom end of the handle or stem 51. The thermal switch 61 includes, for example, a base plate 63, of electric-insulating material, an adjustable contact member 65 mounted on a terminal plate 66 and a bimetal element 67 which, as shown in Fig. 2 of the drawing, may be more or less of U-shape. The free end of the bimetal element 67 is provided with a contact member 69 cooperating with the contact member 65 to control the energization of the heating element and more particularly of the resistor wire 31. For this purpose two electric conductors 71 and 73 are suitably connected to terminal plate 66 and bimetal element 67, respectively, and extend upwardly through the hollow stem 51, the hollow handle 53, and outwardly and downwardly to a connecting plug 74 cooperating with a socket forming a part of the terminal structure 37, the two wires or conductors 71 and 73 being suitably encased to form a twin cord 75, in a manner well known in the art. An extension twin conductor cord 77 is provided and has a connecting plug 79 connected thereto at its end in order to permit of energizing the resistor wire 31 in a manner well known in the art. I may say that the relatively small devices which I have thus far constructed have utilized about 100 watts of electric energy and it has therefore been possible to connect the thermal switch 61 directly in series circuit relation with the resistor 31, substantially as shown in Fig. 1 of the drawing. Since my device is applicable to similar uses in larger sizes, I desire it to be understood that I may use an electromagnetic relay or contactor of appropriate size and construction, the circuit of the energizing coil of the relay or contactor being controlled in a well known manner by the thermal switch 61.

Referring now to Fig. 3 of the drawing, I have there illustrated a simple stirring implement 80 comprising a hollow metallic stem 81 having a thermal switch 61 located therein at its lower end and a hollow handle 53 secured thereto at its upper end together with control circuit conductors extending outwardly through and from the handle 53 as has already been hereinbefore described for the device 49. Any suitable or desired means for closing the lower end of tubular stem 51 or of tubular stem 81 may be employed and I have shown a part of the bottom end of stem 51, designated by numeral 83, as being bent or crimped over and around another part thereof and, if necessary, a soldered joint may be provided, all in a manner well known in the art.

The device illustrated in Fig. 1 of the drawing and hereinbefore described finds a particular field of usefulness in smaller grocery stores where it may be desired to demonstrate fluid foods of various kinds, exemplified more particularly by soup. So long as electric energy is available in a store of this kind, it is possible for an operator upon opening up the store in the morning to put into the inner fluid container 39 the contents of one or more cans of soup, the fluid being indicated by the numeral 85 in Fig. 1 of the drawing, and connect the device electrically to the supply circuit. Where the device is of such size as to receive the contents of an ordinary sized can of soup, the fluid 85 will be heated to the desired temperature of approximately 150 degrees F., in from one-half to one hour, and it is only necessary for an employee of the store to thereafter either serve a small quantity in accordance with the capacity of the ladle 57 to a customer of the store, or to suggest to such customer that he or she help themselves, and then return the spoon or ladle to the inner container where its own configuration will cause it to adjust itself to substantially the position shown in Fig. 1 of the drawing where the thermal switch 61 is immersed in the fluid irrespective of whether the container 39 be full or almost empty.

If it be desired to demonstrate several different kinds of liquid foods at the same time, this can be done by providing a plurality of assemblies 11 on a base 87 and substantially the same comments will apply to the structure shown in Fig. 4 of the drawing as have been made hereinbefore in connection with assembly 11 of Fig. 1.

If it is desired to use a separate spoon, this can be done by using the simple stirring element 80 of Fig. 3, and it is only necessary to occasionally stir the contents of the fluid container 39 and any removal of the fluid therein can be effected by a separate spoon.

It is obvious that any desired temperature of operation of the thermal switch 61 can be obtained by removing the handle 53 from the upper end of stem 51 and then removing the thermal switch 61, as by pulling upwardly on the conductors 71 and 73, after which the adjusting screw 65 may be turned in one or the other direction. It is also possible to vary the temperature of the liquid 85 to some extent by moving or adjustably locating the thermal switch 61 at different heights within the hollow stem 51 instead of at substantially the lower end thereof as shown in Fig. 2 of the drawing.

Referring now to Fig. 5 of the drawing, I have there illustrated a modified form of electric heating element 91, located at the bottom end of inner casing 17 and around the outside thereof. The heating element comprises inner and outer sheets of electric-insulating material with a resistor strip therebetween, annular clamping rings 93, which may be of wire, being used to hold the heating element tightly against the outer surface of inner casing 17. This location of the heating element ensures that it will not be damaged in case the fluid in container 39 should boil over or be accidentally spilled into inner casing 17.

As has already been stated, the device embodying my invention is useful in other applications as well as where fluids are to be maintained at a desired temperature, such as may be the case with liquid glue and where an operator desires to use measured portions thereof from time to time. In this case, of course, the ladle 49 would be useful, but if only small quantities are desired, the amount of which may vary from time to time, it is of course possible to obtain proper control of the temperature of the fluid as by using an immersed stirring member 80 and the liquid glue may be removed by any other suitable or desired means such as a brush or other form of spreader.

The device embodying my invention thus provides a relatively simple and compact hot liquid container available for serving or dispensing measured quantities of the liquid as may be desired, and it is to be noted that the cord 75 having one end thereof extending into the handle 53 and the other end thereof connected to the terminal structure 37 precludes complete separation or dissociation of the stirring implement or ladle from the casing assembly itself. Even if the stirring implement 80 or the ladle 49 were to be left outside of the assembly for a short time, no serious damage would result to the liquid contents 85 since the distance between the heating element 25 and the bottom of the container 39 is preferably made relatively large.

While I have illustrated and described one form of assembly and an additional form of stirring implement, my invention is not limited thereto, and I desire that the claims shall be limited only by the prior art.

I claim as my invention:

1. An electrically heated appliance comprising in combination, an outer heat-insulated casing structure, an electric heating element therein, a fluid container supported by the casing structure, a fluid-stirring implement adapted to be located in the fluid container, and a thermally-actuable heating-element-control-switch located in said implement in heat-receiving relation to a fluid in the container and electric connections between the switch and the electric heating element.

2. An electrically heated appliance comprising in combination, an outer heat-insulated casing structure, an electric heating element therein, a fluid container supported by the casing structure, a ladle having a hollow stem adapted to be located in the fluid container, and a thermally-actuable heating-element-control switch located in the hollow stem in heat-receiving relation to a fluid in the container and electric connections between the thermal switch and the electric heating element.

3. An electrically heated appliance comprising in combination, an outer heat-insulated casing structure, an electric heating element therein, a fluid container supported by the casing structure, a ladle having a hollow stem adapted to be located in the fluid container, a thermally-actuable heating-element-control switch located in the hollow stem closely adjacent to the ladle in heat-receiving relation to the bottom portion of a fluid in said container and electric connections between the thermal switch and the electric heating element.

4. An electrically heated device comprising in combination, an outer heat-insulated casing structure having an open-top well therein, an electric heating element supported by the casing adjacent to the bottom of the well, a fluid container supported by the casing and depending into the well with its bottom spaced from the heating element, a hollow fluid-stirring implement adapted to be located in the fluid container with its depending end close to the lower end of the container, and a thermally-actuable switch electrically connected to and controlling the energization of the heating element located in the depending end of the stirring implement in heat-receiving relation to a fluid in the container.

5. An electrically heated device comprising in combination, an outer heat-insulated casing structure having an open-top inner casing therein, an electric heating element supported by the inner casing adjacent the bottom thereof, a fluid container supported by the inner casing and depending into the same with its bottom spaced from the bottom of the inner casing, a ladle having a hollow stem adapted to be located in the fluid container with its depending end close to the bottom thereof and a thermal switch electrically connected to and for controlling the energization of the heating element, located in the lower end of the hollow stem to be thermally actuated by a fluid in the container.

6. An appliance adapted to keep a fluid hot and effect serving portions thereof, comprising in combination, a casing structure having a well therein, an electric heating element adjacent the bottom of the well, a fluid container located in the well, a ladle, having a hollow stem, adapted to be removably located in the fluid container, a handle secured to the upper end of the stem, a thermal switch located in the hollow stem adjacent its lower end in heat-receiving relation to a fluid in the container and electric conductors connected to the switch, extending through the stem and handle and to the heating element to control the energization thereof.

7. An appliance adapted to keep a stored fluid hot and effect serving portions thereof, comprising in combination, a heat-insulated casing having a well therein, an electric heating element in the casing adjacent the bottom of the well, an open-top fluid container removably located in the well with its bottom portion out of engagement with the heating element, a spoon having a hollow stem adapted to be removably located in the container with the lower end of the stem and the spoon close to the bottom of the container, a handle, of non-heat conducting material, at the upper end of the hollow stem, a thermal switch located in the hollow stem adjacent its lower end to be thermally controlled in accordance with the temperature of a fluid in the container and electric conductors connecting the thermal switch and the heating element to control the heating element by the thermal switch and to permit serving portions of the fluid as desired without loss of control of the heating element.

8. An appliance adapted to keep a stored fluid hot and effect serving portions thereof, comprising in combination, a heat-insulated casing having a well therein, an electric heating element in the casing adjacent the bottom of the well, an open-top fluid container removably located in the well with its bottom portion out of engagement with the heating element, a spoon having a hollow stem adapted to be removably located in the container with the lower end of the stem and the spoon close to the bottom of the container, a handle of non-heat conducting material at the upper end of the hollow stem, a thermal switch located in the hollow stem in heat-conducting engagement therewith and closely adjacent to the spoon to be actuated in accordance with the temperature of a liquid in the container and electric conductors connected to the thermal switch extending through the hollow stem and the handle and to the heating element to retain control of the temperature of the fluid in the container and prevent dissociation of the spoon from the appliance.

9. An appliance for heating and storing a fluid comprising in combination, a casing having a well, an electric heater in the well, an open top fluid container in the well, a combined stirring means and a thermal heater-control switch therewithin and an electric connection between the switch and the heater to control the temperature of the fluid in the container and preclude operative separation of the stirring means from the appliance.

10. An appliance for heating and storing a fluid and effecting removal of small quantities thereof from the appliance from time to time, comprising in combination, a casing having a well, an electric heater adjacent the bottom of the well, an open top fluid container in the well, a combined stirring and serving spoon and a thermal heater-control-switch encased thereby and an encased electric connection between the switch and the heater to control the temperature of the fluid in the container and preclude operative separation of the spoon from the appliance.

CARL V. KRICHTON.